United States Patent [19]

Bouton

[11] Patent Number: 5,459,487

[45] Date of Patent: Oct. 17, 1995

[54] VIDEO GAME/FLIGHT SIMULATOR CONTROLLER WITH SINGLE ANALOG INPUT TO MULTIPLE DISCRETE INPUTS

[75] Inventor: Frank M. Bouton, Beaverton, Oreg.

[73] Assignee: Thrustmaster, Inc., Tigard, Oreg.

[21] Appl. No.: 340,055

[22] Filed: Nov. 15, 1994

Related U.S. Application Data

[62] Division of Ser. No. 206,204, Mar. 2, 1994, Pat. No. 5,389,950, which is a continuation of Ser. No. 140,329, Oct. 20, 1996, abandoned, which is a continuation of Ser. No. 911,765, Jul. 9, 1992, abandoned.

[51] Int. Cl.$^6$ ...................................................... G09G 3/02
[52] U.S. Cl. ...................... 345/156; 345/157; 345/161; 273/438
[58] Field of Search ...................... 345/156, 157, 345/161, 163; 338/68, 92; 273/438

[56] References Cited

U.S. PATENT DOCUMENTS

| | | | |
|---|---|---|---|
| 4,321,851 | 3/1982 | Adachi | 84/DIG. 7 |
| 4,397,211 | 8/1983 | Ferdinand | 84/DIG. 8 |
| 4,483,230 | 11/1984 | Yamauchi | 84/615 |
| 4,501,424 | 2/1985 | Stone et al. | 273/148 |
| 4,588,187 | 5/1986 | Dell | 273/1 |
| 4,703,302 | 10/1987 | Hino et al. | 338/260 |
| 4,739,128 | 4/1988 | Grisham . | |
| 4,804,940 | 2/1989 | Takigawa et al. | 338/320 |
| 4,852,031 | 7/1989 | Brasington . | |
| 4,868,780 | 9/1989 | Stern | 364/900 |
| 4,924,216 | 5/1990 | Leung | 340/709 |
| 5,134,395 | 7/1992 | Stern | 341/20 |
| 5,245,320 | 9/1993 | Bouton . | |
| 5,389,950 | 2/1995 | Bouton | 345/156 |

OTHER PUBLICATIONS

Lewis C. Eggebrecht, *Interfacing to the IBM Personal Computer*, 1987, pp. 129, 197–199.

Crotty, Cameron, "Taking Control," *PCGames Magazine*, Aug./Sep. 1992, pp. 16–17.

"Hardware Review," *Computer Game Review*, Aug. 1992, p. 36.

Willis, Grant, "Finding the 'joy'in a joystick," *The Army Times*, Oct. 4, 1993, p. 48.

"Strategy Plus," *CES* (Consumer Electronics Show), Summer 1993, p. 17.

*Primary Examiner*—Ulysses Weldon
*Assistant Examiner*—Matthew Luu
*Attorney, Agent, or Firm*—Marger, Johnson, McCollom & Stolowitz

[57] ABSTRACT

A video game controller, for inputting command signals to a game port having a finite number of discrete and analog signal inputs, provides a plurality of additional discrete outputs multiplexed on one of the analog outputs. This controller has a plurality of parallel switches each coupled to the one analog output via a different value resistance. Circuitry in the game board in combination with programming in the video game or simulation software recognizes discrete voltage levels input from the controller via the one analog port as different discrete commands. This enables the range of commands that can be input from a video game controller to be substantially increased without making any change to the base computer hardware.

8 Claims, 3 Drawing Sheets

U.S. Patent    Oct. 17, 1995    Sheet 1 of 3    5,459,487
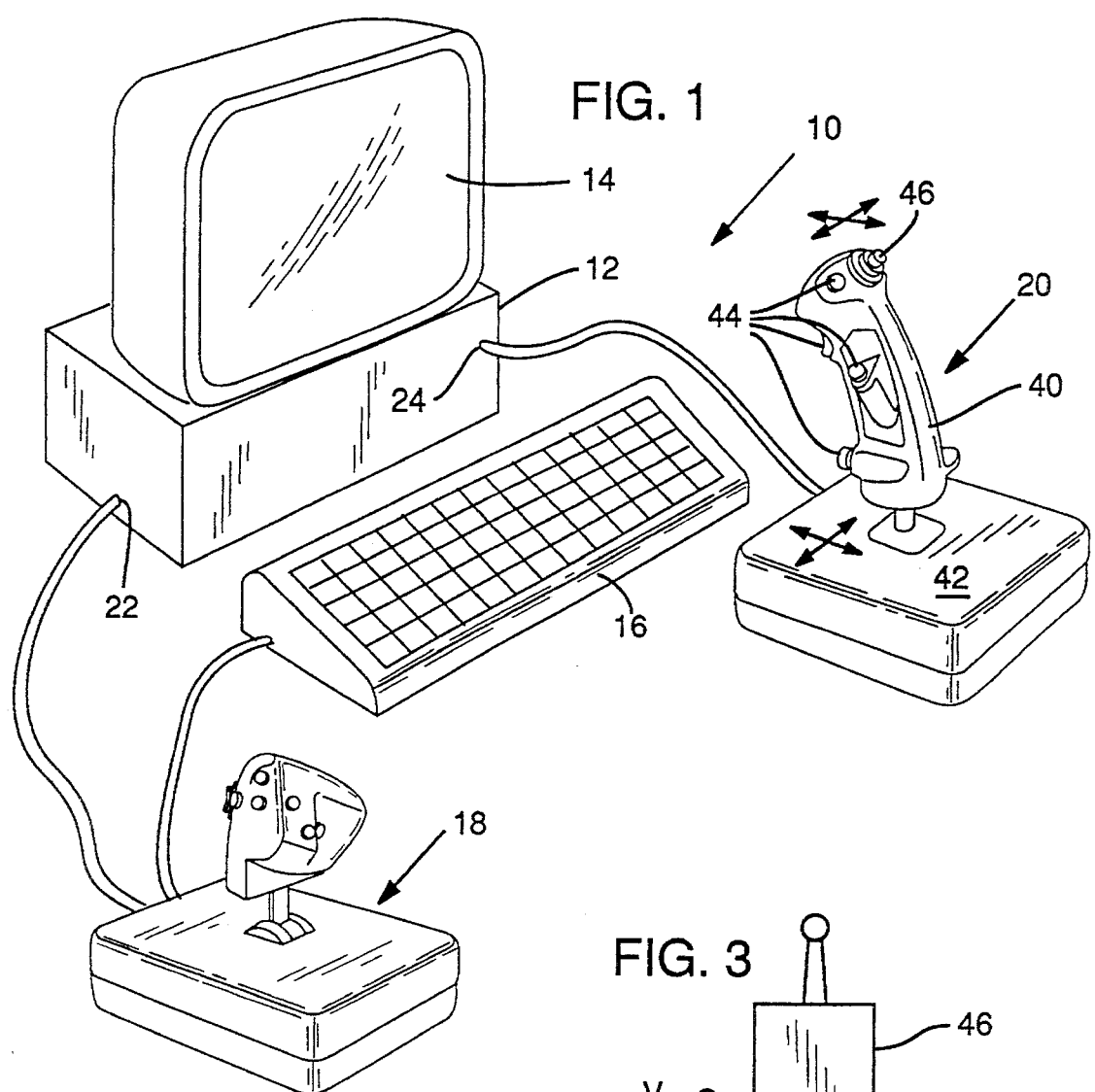
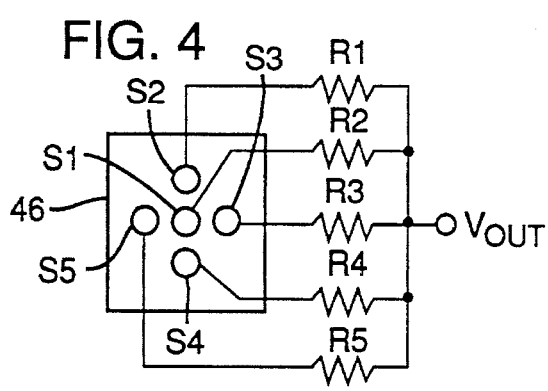

VIDEO GAME/FLIGHT SIMULATOR CONTROLLER WITH SINGLE ANALOG INPUT TO MULTIPLE DISCRETE INPUTS

This is a division of U.S. Ser. No. 08/206,204, filed Mar. 2, 1994, now U.S. Pat. No. 5,389,950, which was a file wrapper continuation application of U.S. Ser. No. 08/140,329, filed Oct. 20, 1993, now abandoned, which was a file wrapper continuation application of U.S. Ser. No. 07/911,765, filed Jul. 9, 1992, now abandoned.

BACKGROUND OF THE INVENTION

This invention relates generally to controllers for video games and simulators implemented on a computer and more particularly to handheld controllers for inputting multiple different user commands to video game and simulation programs in a personal computer via a game port having a limited number of control signal inputs.

Conventionally, a personal computer is enabled to be controlled by external manual control devices by means of a game card, which provides an external game port into which control devices, such as a joystick, can be plugged. To provide widespread compatibility, which is essential to the ability to mass market a wide variety of video games and simulation programs, industry standards have been developed for game cards for personal computers such as those commonly referred to as IBM-compatibles. The universal adoption of these standards means that any external manual input device designed to control such computers and software must be compatible with the industry-standard game port. Any input device lacking such compatibility will not be able to be used with conventional personal computers equipped with standard game boards and will not be widely accepted.

The problem is that the industry standard game port provides only a limited number of inputs: four discrete signal inputs for receiving binary signals signifying "On" and "Off" and four analog signal inputs for receiving variable voltage signals, such as output by a potentiometer, which are continuously variable over a limited range. The number of game boards that can be plugged into a conventional PC is also limited, to one. Consequently, the number of allowable functions which can be communicated with a game controller through the standard game port is severely restricted.

Attempting to circumvent these limitations, video game and simulator programmers have implemented many commands by programming function keys on the PC keyboard. This approach detracts from the realism of simulation, which is particularly important to flight simulation video games. Further developers have strived to attain more realism by designing microprocessor-based input devices which output keycodes to the PC keyboard port emulating function keys on the PC keyboard. These efforts have been successful to some extent but have also encountered limits on the number of controllers that can be used simultaneously. In flight simulation video games designed to simulate operation of fighter aircraft, for example, it is desirable to have both a joystick and a throttle, each having a plurality of buttons and knobs just like real combat aircraft but operable to control various functions in the simulation software. Especially, there is a need for many more discrete or binary control inputs. The existing input capabilities of a conventional game port, even augmented by a keyboard port input device, does not permit the implementation of such a wide range of control inputs.

Accordingly, a need remains for a better way to input a plurality of external user-actuable control signals to a video game or simulation program running on a conventional PC via a conventional game port without having to use the PC keyboard.

SUMMARY OF THE INVENTION

It is, therefore, an object of the invention to input a plurality of external user-actuable control signals from a multi-functional controller to a video game or simulation program running on a conventional PC via a conventional game port having a limited set of discrete and analog inputs.

Another object of the invention is to input many more discrete inputs to a video game or simulation program on a conventional PC than a conventional game port permits.

A further object of the invention as aforementioned is to provide more discrete inputs without using up all the analog inputs of a conventional game port.

The invention is an improvement in a video game controller which provides a plurality of additional discrete outputs multiplexed on one of the analog outputs. This improvement is implemented by a plurality of parallel switches each coupled to the one analog output via a different value resistance, in combination with programming in the video game or simulation software to recognize discrete voltage levels input from the controller via the one analog port as different discrete commands.

This invention enables the range of commands that can be input from a video game controller to be substantially increased without making any change to the base computer hardware. A mere software change is needed to make use of the new control capabilities. This invention enables much more sophisticated video games to be played successfully on a standard PC but is not limited to game-playing. It can be used in other applications of personal computers that make use of a game port or similarly limited input port, such as in data logging systems. Also, more than one of the analog inputs to the game port can be used in the same way to further multiply the number of discrete control signals that can be input.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of a conventional personal computer and keyboard with two game controllers including a joystick controller with multiple discrete input control device operable in conjunction with software in the personal computer in accordance with invention.

FIG. 3 is a side elevation view of a multiple discrete input control device in accordance with the invention as used in the joystick controller of FIG. 1.

FIG. 4 is a top plan view of the control device of FIG. 3.

DETAILED DESCRIPTION

Figure 2:
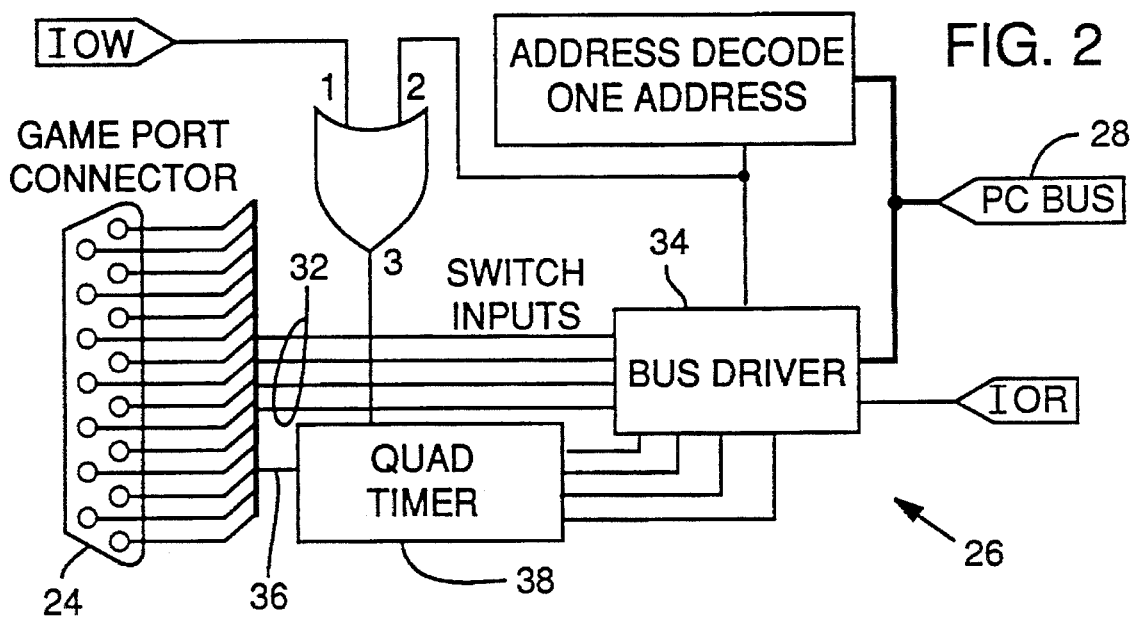
FIG. 2 is a block diagram of a conventional game board circuit connected to a conventional personal computer input/output bus.

FIG. 1 shows a video game/simulation system 10 for simulating operation of a complex system having a plurality of user-controlled functions. The system includes a conventional personal computer 12 having a microprocessor operable under control of a video game/simulation program, a conventional display 14 for displaying images produced by operation of the program in the microprocessor, and optionally a conventional keyboard 16.

Preferably, for running aviation video games and simulation programs, both a throttle controller 18 and a joystick controller 20 are connected to the computer. The throttle controller is connected to the computer via a conventional keyboard port 22 and has the keyboard 16 connected to it via an internal microprocessor so that both can be operated in conventional manner. Since the throttle controller 18 is not germane to the present invention, it is not described except to point out that it occupies the principal available input port besides the game port and, itself implements a plurality of control functions desirable to operation of multi-controller video games and simulators such as those emulating combat aircraft.

The joystick controller 20 is connected via a conventional game port connector 24 of a game board 26. As shown in FIG. 2, the game board 26 is coupled to a PC input/output bus 28 which is conventionally provided in computer 12 for connecting peripheral input and output devices to the PC microprocessor. The game card includes an address decode circuit 30 by which the PC microprocessor and any video game and simulation programs running thereon select the game card to access inputs from it.

Conventionally, the game board coupled to the PC bus 28 has a finite number of inputs for receiving and inputting to the microprocessor a limited number of discrete and analog input signals. Four binary or discrete switch inputs 32 from the game port connector 24 are coupled to the PC bus 28 via a bus driver 34. Four analog inputs from the game port connector are coupled to the PC bus 28 via a quad timer 38 which includes a one shot circuit that receives variable voltage level signals from the game port connector 24 and outputs constant level signals of a duration proportional to input voltage level to the PC bus 28 via bus driver 34.

The joystick controller 20 conventionally has a handle 40 pivotally coupled to a base 42 for forward/rearward movement and left/right movement by the user as indicated by arrows 48. The handle is connected in the base to transducers coupled to two of the analog inputs 36 of the game port to input proportional signals to the PC microprocessor to control analog functions in the video game/simulation program. The handle 40 also includes four discrete switches 44 that are operable by the user's fingers to control discrete functions in the video game/simulation program.

In popular aviation video games and simulators, it is customary to switch views from the user's simulated aircraft-forward, up, down, right and left-by actuation of assigned function keys on the keyboard. To impart more realism as well as speed up actions, it is preferable to accomplish these discrete control functions without releasing the controllers 18, 20. According to the invention, the joystick controller is also provided with a multi-position switch 46, better seen in FIGS. 3 and 4, having a center position and movable in forward and rearward directions and right and left directions as indicated by arrows 50. Each of these positions contains a switch, shown schematically in FIGS. 5 and 6, which is selectable by moving the switch with the thumb.

The joystick controller 20 cannot have a number of analog output signal lines exceeding the number of analog switch inputs 36 to the game board or a number of discrete output signal lines exceeding the number of discrete switch inputs 34 to the game board. The four discrete switches 44 already occupy all available discrete inputs 32 to the game card. To overcome this limitation, the individual switches S1, S2, ... Sn of the multi-position switch 46 are all coupled between a common voltage source Vin and one of the analog output signal lines through a different impedance so as to produce a different discrete voltage level of signal Vout on the analog output signal line uniquely corresponding to actuation of each switch.

Figure 5:
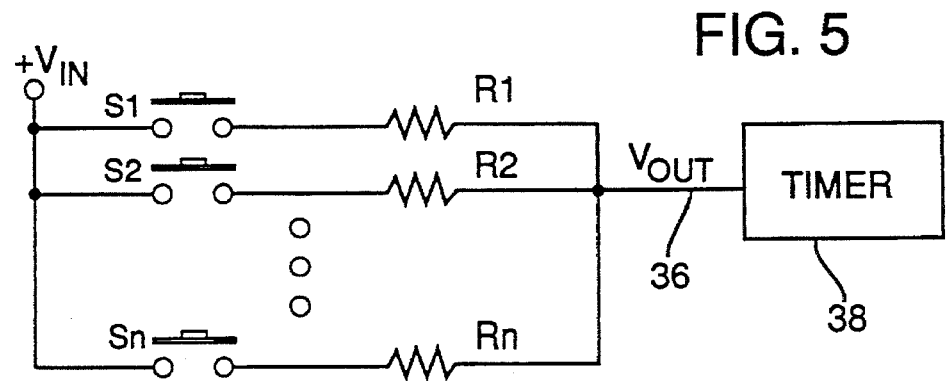
FIG. 5 is a schematic view of a first embodiment of the device of FIG. 3 coupled to the game board circuit of FIG. 2 in accordance with the invention.

FIG. 5 shows a switch circuit arranged so that each switch S1, S2, ... Sn is connected in series with a resistor to form a single switching subcircuit and all of the switching subcircuits are connected between the common input voltage node and a single output node coupled to said one analog output signal line. In this circuit it is preferred for each resistor to have a different value of resistance.

Figure 6:
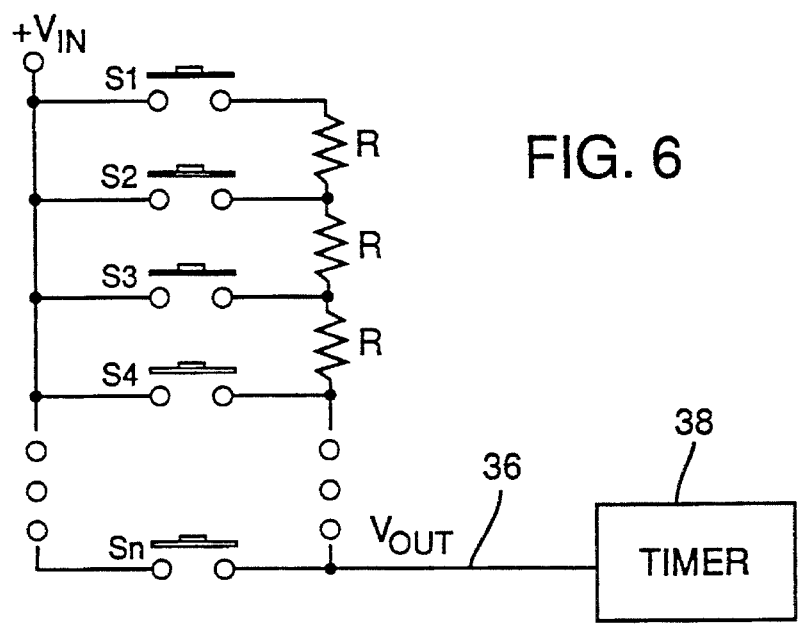
FIG. 6 is a schematic view of a second embodiment of the device of FIG. 3 coupled to the game board circuit of FIG. 2 in accordance with the invention.

FIG. 6 shows a switch circuit arranged in a ladder circuit with the switches S1, S2, ... Sn connected between the common input node and a series at output nodes coupled in series by separate resistors to a single output node coupled to said one analog output signal line. In this circuit it is preferred for each resistor to have the same value of resistance.

Figure 7:
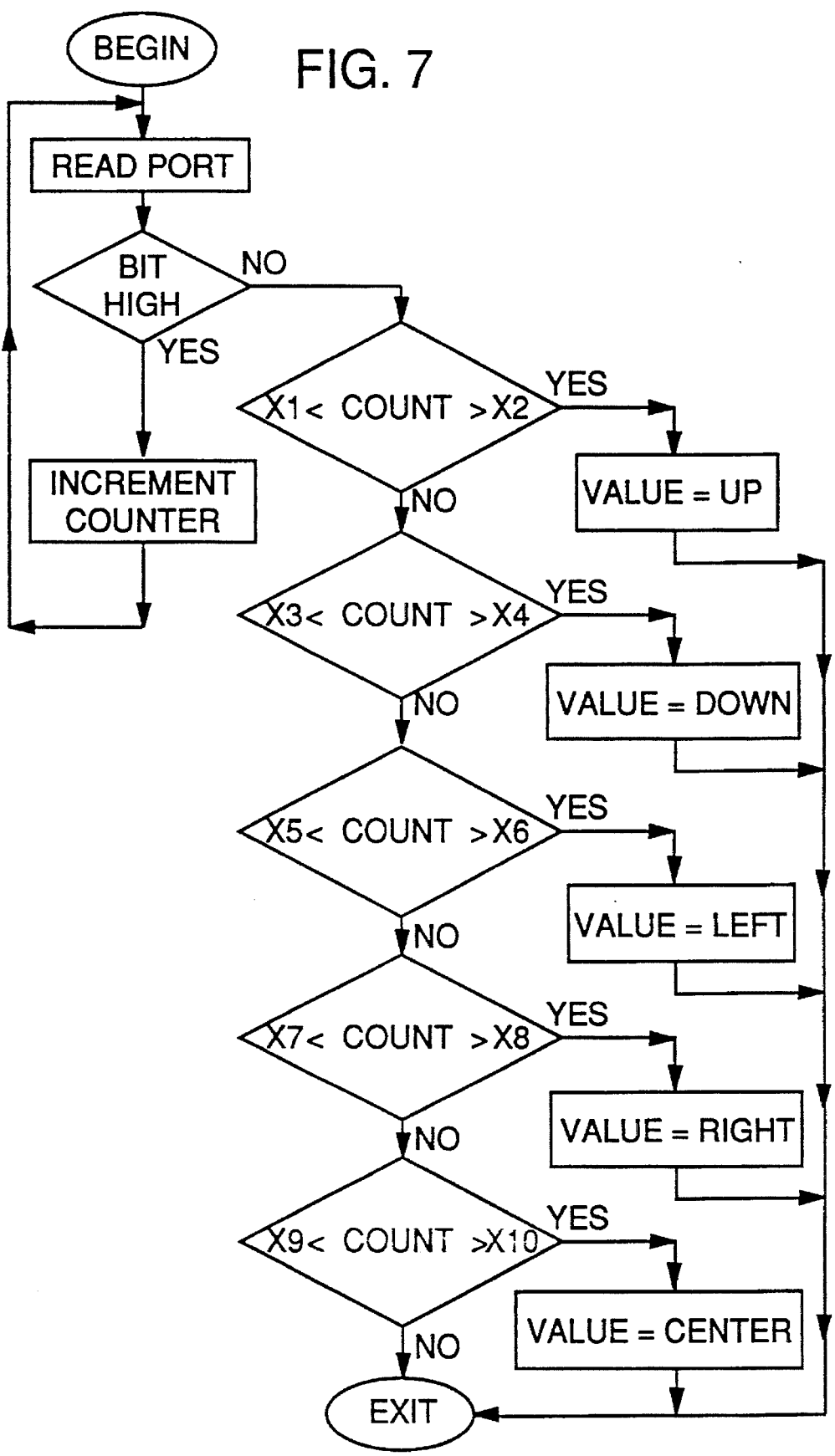
FIG. 7 is flow chart for an input control routine to be used in video game or simulator software for interpreting analog inputs from the control device of FIG. 3 in accordance with the invention.

The game board timer 38 converts the different discrete signal levels on the analog output signal line 38 into different duration signals. A subroutine, shown in FIG. 7, is added to the video game/simulation program for timing the different duration signals and selecting a unique control command in the program in accordance with the timed duration. In this way, the personal computer interprets each different discrete level of signal as a separate discrete command and inputs such command to the video game/simulation program to effect a corresponding change in the displayed images produced by the program.

Having described and illustrated the principles of the invention in a preferred embodiment thereof, it should be apparent that the invention can be modified in arrangement and detail without departing from such principles. I claim all modifications and variation coming within the spirit and scope of the following claims:

1. A controller for a personal computer having a game board with a finite number of inputs for receiving and inputting to the computer a first limited number of analog input signals and a second limited number of discrete input signals, the controller comprising:

a number of analog output signal lines not exceeding said first number and a number of discrete output signal lines not exceeding said second number;

a game board connector coupled to the analog and discrete output signal lines for inputting controller signals to the game board inputs;

a plurality of switches all coupled to a common input voltage node; and circuit means coupling all of the plurality of switches to one of the analog output signal lines through a different resistance so as to produce a different discrete level of signal on said one analog output signal line uniquely corresponding to actuation of each of the switches;

thereby enabling input of different controller signals from said plurality of switches to the computer through the game board connector by use of only said one analog signal line.

2. A video game/simulator controller according to claim 1 in which the circuit means is arranged so that each switch is connected in series with a resistor to form a single switching subcircuit and all of the switching subcircuits are connected between the common input voltage node and a single output node coupled to said one analog output signal line.

3. A video game/simulator controller according to claim 2 in which each resistor has a different value of resistance.

4. A video game/simulator controller according to claim 1 in which the circuit means is arranged in a ladder circuit with the switches connected between the common input node and a series of output nodes coupled in series by separate resistors to a single output node coupled to said one analog output signal line.

5. A video game/simulator controller according to claim 4 in which each resistor has the same value of resistance.

6. A video game/simulator controller according to claim 1 in which the plurality of switches are formed in a multi-position switch including an actuation member having at least four actuation positions and at least four switch elements, one at each actuation position, so movement of the actuation member to each actuation position uniquely actuates one of said switch elements.

7. A system comprising:

a personal computer having a microprocessor, a display, and an input/output bus for connecting peripheral input and output devices to the microprocessor;

a computer program executed by said microprocessor, said program having a plurality of user-controlled functions;

a game board coupled to the input/output bus, the game board having an analog signal input for receiving and inputting to the microprocessor an analog input signal and a timer for converting the analog input signal level to a digital signal having a pulse width proportional to the level of the analog input signal;

a controller having an analog output signal line coupled to the game board analog signal input;

a plurality of discrete switches mounted on said controller, each discrete switch corresponding to a user-controlled function;

a resistor network coupled between the plurality of discrete switches and the analog output signal line so as to produce a unique level of signal on said analog output signal line when a corresponding one of said switches is actuated, so that the timer produces unique digital signals each having a unique pulse width respectively corresponding to each of the actuated switches; and computer software executed by said microprocessor which measures the pulse width of each timer unique digital signal, associates the unique pulse width of the timer digital signal with the corresponding discrete switch, and indicates to the video game/simulator program that the corresponding discrete switch has been actuated, wherein the computer program executes one of the user-controlled functions corresponding to the indicated discrete switch.

8. A method of controlling a computer system having a plurality of user-controlled functions, the system including a personal computer having a game board coupled to the input/output bus, the game board having an analog signal input for receiving and inputting to the microprocessor an analog input signal and a timer for converting the signal level of the analog input signal to a digital signal having a pulse width proportional to the level of the analog input signal, the method comprising:

providing a controller having an analog output signal line and a plurality of discrete switches, each switch corresponding to a user-controlled function;

connecting the controller analog output signal line to the game board analog signal input;

connecting all of the plurality of discrete switches to the analog output signal line through a different impedance so as to produce a unique level of signal on said analog output signal line when a corresponding one of said switches is actuated, so that the timer produces unique digital signals each having a unique pulse width respectively corresponding to each of the actuated switches; and measuring the pulse width of each timer digital signal;

associating the measured pulse width of the timer digital signals with the corresponding discrete switch; and executing the user-controlled function corresponding to the discrete switch associated with the measured pulse width.

\* \* \* \* \*